(12) United States Patent
Uematsu

(10) Patent No.: US 7,075,897 B2
(45) Date of Patent: Jul. 11, 2006

(54) METHOD FOR RESOLVING DUPLICATION OF TERMINAL IDENTIFIERS IN A WIRELESS COMMUNICATION SYSTEM

(75) Inventor: Akira Uematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 958 days.

(21) Appl. No.: 10/022,427

(22) Filed: Dec. 20, 2001

(65) Prior Publication Data

US 2002/0075836 A1    Jun. 20, 2002

(30) Foreign Application Priority Data

Dec. 20, 2000    (JP) .............................. 2000-387886

(51) Int. Cl.
*H04L 12/28* (2006.01)
*G06F 15/177* (2006.01)

(52) U.S. Cl. ................. 370/255; 370/338; 370/395.54; 709/220

(58) Field of Classification Search ................ 370/245, 370/255, 395.54, 453
See application file for complete search history.

(56) References Cited

U.S. PATENT DOCUMENTS

| | | | | |
|---|---|---|---|---|
| 5,229,988 A | * | 7/1993 | Marbaker et al. | 370/245 |
| 5,327,534 A | * | 7/1994 | Hutchison et al. | 709/226 |
| 5,708,654 A | * | 1/1998 | Arndt et al. | 370/242 |
| 5,724,510 A | * | 3/1998 | Arndt et al. | 709/220 |
| 5,850,338 A | * | 12/1998 | Fujishima | 700/3 |
| 6,009,103 A | * | 12/1999 | Woundy | 370/401 |
| 6,343,064 B1 | * | 1/2002 | Jabbarnezhad | 370/216 |
| 6,542,510 B1 | * | 4/2003 | Fujimori et al. | 370/402 |
| 6,687,252 B1 | * | 2/2004 | Bertrand et al. | 370/401 |
| 6,801,507 B1 | * | 10/2004 | Humpleman et al. | 370/257 |
| 6,826,611 B1 | * | 11/2004 | Arndt | 709/226 |
| 6,847,621 B1 | * | 1/2005 | Asahina | 370/331 |
| 6,862,284 B1 | * | 3/2005 | Spiegel et al. | 370/395.1 |
| 6,862,286 B1 | * | 3/2005 | Tams et al. | 370/401 |

OTHER PUBLICATIONS

Ryan Troll, "Automatically Choosing an IP Address in an Ad-Hoc IPv4 Network", draft-ietf-dhc-ipv4-autoconfig-04. txt, Dynamic Host Configuration WG, Apr. 14, 1999, 16 pages.

* cited by examiner

*Primary Examiner*—John Pezzlo
*Assistant Examiner*—Brian Roberts
(74) *Attorney, Agent, or Firm*—Young & Thompson

(57) ABSTRACT

A wireless communication system wherein if a terminal receives an address duplication detection packet that terminal compares the duplication detection address with the IP address of itself and if those addresses are similar, sends a duplication notification packet, however if those addresses are not similar, the terminal investigates whether or not the duplicated address is being held in an address coordination table. If the duplicated address is not being held in that table, the terminal makes a new registration of that address in the table while if that duplicated address is held in that table, the terminal compares the combination of that duplicated address and the sender physical identifier of the duplication detection packet with the combinations inside the coordination table. If those combinations are equivalent, the terminal resets an address coordination maintenance timer while if they are not equivalent, the terminal changes the reception settings of packet reception part 83 to enable reception of packets each of which includes the duplication detection address and the sender physical identifier of the duplication inspection packet as the destination physical identifier, and starts up duplication notification packet wait-for-send timer 81 however if timer 81 times out, a duplication notification packet is sent.

9 Claims, 18 Drawing Sheets

METHOD FOR RESOLVING DUPLICATION OF TERMINAL IDENTIFIERS IN A WIRELESS COMMUNICATION SYSTEM

BACKGROUND OF THE INVENTION

1. Field of the Invention

This invention relates to a wireless communication system, and more specifically a wireless communication system in which issues of duplication of terminal identifiers like IP addresses is resolved through distributed operation among terminals, without a server or an administrator which centrally allocates terminal identifiers to terminals on the network.

2. Description of Related Art

The conventional method for allocating unique IP addresses for each terminal on an IP network where no network manager or server exists, for example Auto IP proposed in an Internet Draft (draft-ietf-dhc-ipv4-autoconfig-04.txt), involves a method by which a terminal randomly chooses an temporary IP address from a certain range of IP addresses when the terminal boots up, resolves duplication of IP addresses in the network, then determines an address to use in operation.

Auto IP procedures will now be described with reference to the drawings.

Firstly, FIG. 15 shows elements of a duplication detection packet used for detecting a duplication of IP address through Auto IP procedures. The terminal transmitting duplicate detection packets sets a special identifier indicating broadcast to all terminals for destination physical identifier 10, its own physical identifier for sender physical identifier 11, a value representing a duplication detection packet for packet type identifier 12 and an IP address forming the subject of duplication detection for duplication detection IP address 13.

FIG. 16 shows elements of a duplication notification packet used for notifying duplication of IP address used in Auto IP procedures. The terminal that detects duplication of IP address and sends a duplication notification packets sets the physical identifier of the terminal which transmitted duplication detection packet related to this duplication notification packet for destination physical identifier 20, sets its own physical identifier for sender physical identifier 21, sets a value representing a duplication notification packet in packet type identifier 22 and sets the detected duplicate IP address for duplication notification IP address 23.

FIG. 17 is a block diagram showing the functional elements related to IP address configuration of the terminal that resolves duplication of IP address through Auto IP procedures. At startup, the terminal randomly selects its own IP address through an IP address selection part 30, stores this IP address in an IP address storage part 31 and forwards the selected IP address to duplication detection packet assemble part 32. At duplication detection packet assemble part 32 a duplication detection packet as shown in FIG. 15 is assembled for detecting whether or not the IP address thus input is already in use on the network and the IP address forwarded from IP address selection part 30 is set for duplication detection IP address 13. Once the duplication detection packet is assembled at duplication detection packet assemble part 32, part 32 forwards that packet to a packet transmission part 33 while simultaneously timer 34 that waits for a duplication notification packet (duplication notification packet waiting timer 34) commences operation. Packet transmission part 33 transmits the packet thus passed from the duplication detection packet assemble part 32 to the network. As packet reception part 35 receives a packet with destination physical identifier specifying special identifier indicating broadcast or specifying its own physical identifier, part 35 forwards the packet thus received to reception packet analysis part 36.

FIG. 18 is a flowchart illustrating the procedure of reception packet analysis part 36. If reception packet analysis part 36 receives a packet from packet reception part 35, part 36 identifies the type of received packet from the packet type identifier (step S 41). If the received packet is a duplication detection packet part 36 performs processes for a duplication detection packet (step S 42) and if the packet is a duplication notification packet part 36 performs the processes for a duplication notification packet (step S 43) while if the packet is neither a duplication detection packet nor a duplication notification packet, part 36 forwards that packet to reception packet processing part 39 shown in FIG. 17 (step S 44) where part 39 performs the appropriate procedures depending on the type of packet.

FIG. 19 is a flowchart illustrating in detail the procedures for duplication detection packet processes of step S 42 in FIG. 18. If reception packet analysis part 36 receives a duplication detection packet, in Step S51, part 36 decides whether or not the duplication detection IP address 13 of the duplication detection packet received is equal to its own IP address held in IP address storage part 31 shown in FIG. 17. If these addresses are equal, part 36 passes that IP address and the sender's physical identifier 11 of the duplication detection packet received to duplication notification packet assemble part 37 shown in FIG. 17 (step S 52). Duplication notification packet assemble part 37 assembles a duplication notification packet shown in FIG. 16, sets the physical identifier passed from reception packet analysis part 36 for destination physical identifier 20 and the IP address for duplication notification IP address 23 and forwards that packet to packet transmission part 33.

FIG. 20 is a flowchart illustrating in detail the procedures for duplication notification packet processes of step S43 in FIG. 18.

If reception packet analysis part 36 receives a duplication notification packet, part 36 detects that the IP address selected by IP address selection part 30 shown in FIG. 17 is already used by other terminal, stops duplication notification packet waiting timer 34 shown in FIG. 17 if the timer is still operating (step S61, S62), then restarts IP address selection part 30 in FIG. 17 (Step S63).

If duplication notification packet waiting timer 34 as shown in FIG. 17 expires, normal communication commences using an IP address held in IP address storage part 31.

In the above description an IP address is used to identify terminals, however besides this, using host names for terminal identifiers is also conceivable. Even when using something other than an IP address as a terminal identifier, usage of the same method as above for resolving IP address duplication is conceivable for solving duplication and deciding a unique terminal identifier on a network.

In a wireless communication network, hidden terminal problem is known which may arise depending on the location of terminals. Hidden terminal problem will now be described with reference to FIG. 21. Of the terminals positioned in FIG. 21, terminal 70 is located in communication area 74 of terminal 71 and because terminal 71 is located in communication area 73 of terminal 70, terminal 70 and terminal 71 are able to communicate with each other. In the same way, terminal 70 and terminal 72 are capable of mutual communication. On the other hand, because terminal 71 is located outside the communication area of terminal 72 and vice versa, communication between terminal 71 and 72 is not possible. Accordingly, while terminal 70 is capable of communicating to both terminal 71 and terminal 72, communication is not possible between terminal 71 and terminal 72 and so terminal 71 and terminal 72 are said to be in relation of hidden terminal.

In the IP address duplication resolving methodology by Auto IP described above, a terminal broadcasts IP address duplication detection packets over the network. But when as in the case of a wireless network, the broadcast packets from a terminal can not reach those terminals in relation of hidden terminal with the sender, so there arises a problem that duplication of IP addresses cannot be detected even though IP addresses are in fact duplicated. For example, referring to FIG. 21, when terminal 70 and terminal 71 each communicate using different IP addresses, terminal 72 starts up and executes Auto IP procedures. Because an IP address duplication detection packet broadcast by terminal 72 does not reach to terminal 71 that is in a relation of hidden terminal with terminal 72, even though an IP address selected by terminal 72 is the same as that used by terminal 71, terminal 71 does not send a duplication notification packet to terminal 72, so terminal 72 cannot detect the IP address duplication and commences communication using the same IP address as terminal 71. In this situation terminal 70 cannot distinguish between terminal 71 and terminal 72 problems will occur where for example, packets targeted to terminal 71 are in fact sent to terminal 72.

Further, there may be a case that multiple terminals each outside the respective communication areas are using the same IP address, then come to be able to communicate with each other by some reason like moving into respective communication area. In this case IP address duplication will arise, but under the conventional methodology the problem cannot be resolved until one of the terminals having the duplicated IP address broadcasts a packet over the IP network by some necessity.

Again, there is a problem with the conventional methodology in that after an IP address to be used is once decided, even if duplication of that IP address is detected there is no way to resolve that duplication.

The above description posits the problems arising when using IP addresses as terminal identifiers, however the same problem exists where something like host names are used as terminal identifiers.

SUMMARY OF THE INVENTION

The object of the present invention is to provide a wireless communication system wherein, even when duplication of terminal identifiers in a network occurs among terminals in relation of hidden terminal and thus these terminals are unable to communicate directly with each other to resolve this duplication, a terminal capable to communicate to all terminals which have the duplicate identifier detects this duplication, notifies this duplication of terminal identifiers to those terminals having the duplicate identifier, the terminals with duplicate identifier can detect the duplication and then can resolve that duplication.

A further object of this invention is to provide a wireless communication system wherein a terminal periodically broadcasts its own terminal identifier over the network, so that multiple terminals with the same terminal identifier formerly cannot communicate each other by some reason like that each terminal is located outside the communication range of the other and then become able, through something like being moved for example, to communicate with each other, the duplication of terminal identifiers can be quickly detected.

Another object of this invention is to provide a wireless communication system wherein, even after the terminal identifier to be used by a terminal has been decided, if the terminal detects duplication of that terminal identifier in the network, acquires a unique terminal identifier within the network and then resumes communication.

A wireless communication system of the present invention operates such that if one terminal detects that amongst all of the other terminals to which it can itself communicate that have a different terminal identifier to itself, there are multiple terminals with the same terminal identifier, that one terminal notifies the duplication of terminal identifier to all, some or one of those multiple terminals with the same terminal identifier.

A wireless communication system of the present invention operates such that if one terminal detects that amongst all of the other terminals to which it can itself communicate that have a different terminal identifier to itself, there are multiple terminals including any hidden terminal using or about to commence using the same terminal identifier, that one terminal notifies the duplication of terminal identifier to all, some or one of those multiple terminals using or about to commence using that same terminal identifier.

A wireless communication system of the present invention operates such that if one terminal that, when it joined onto the network selected a terminal identifier not duplicate with any other terminal and commenced communicating detects duplication of that terminal identifier with any other terminal after it has commenced communication, that detecting terminal changes the terminal identifier.

A wireless communication system of the present invention operates such that if one terminal detects that amongst all of the other terminals to which it can itself communicate that have a different terminal identifier to itself, there are multiple terminals with the same terminal identifier, that one terminal notifies the duplication of terminal identifier to all, some or one of those multiple terminals with the same terminal identifier, so that even when those multiple terminals with the same identifier are unable to detect the duplication by direct communication with each other due to being in relation of hidden terminal, the duplication can be detected by notification from that one terminal capable of communicating to those multiple terminals with the same identifier, and detection of duplication of terminal identifiers and processes to resolve that duplication can be performed easily.

A wireless communication system of the present invention operates such that if one terminal detects that amongst all of the other terminals to which it can itself communicate that have a different terminal identifier to itself, there are multiple terminals including any hidden terminal using or about to commence using the same terminal identifier, that one terminal notifies the duplication of terminal identifier to all, some or one of those multiple terminals using or about to commence using that same terminal identifier, that terminal about to commence using that duplicate terminal identifier repeats arbitrarily selecting a terminal identifier and making inquiries to other terminals until a terminal identifier not duplicated with other terminals on the network is found, and where communication by that terminal with other terminals inside the network commences using a terminal identifier confirmed as being not duplicated with other terminals on the network, even at times when duplication of terminal identifiers is unable to be detected by those terminals due to being in relation of hidden terminal, the duplication can be detected by notification from that one terminal capable of communicating to those multiple terminals with the same identifier, and detection of duplication of terminal identifiers and processes to resolve that duplication can be performed easily.

A wireless communication system of the present invention operates such that if one terminal that, when it joined onto the network, selected a terminal identifier not duplicated with any other terminal and commenced communicating detects duplication of that terminal identifier with other terminals after it has commenced communication, that detecting terminal changes the terminal identifier into a new one, so that even after a terminal identifier for use by that terminal has been decided, if duplication of that terminal identifier is detected, it becomes possible for that terminal to acquire a unique terminal identifier within the network and resume communication.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

An embodiment of the present invention will now be described with reference to the drawings.

In a wireless communication system according to a first embodiment of the present invention each terminal performs communication using IP and together form an IP network while IP addresses are used as terminal identifiers.

Figure 1:
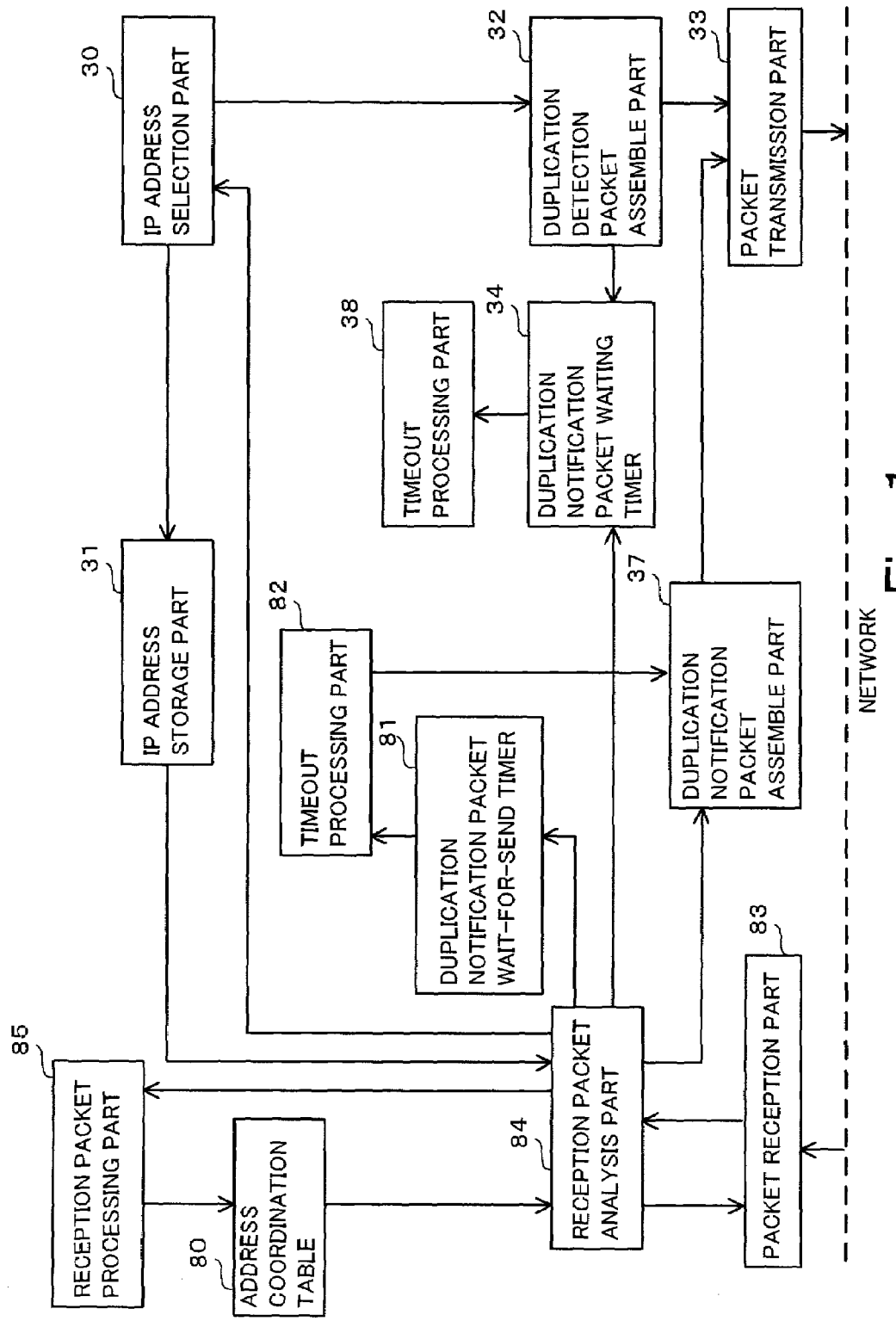
FIG. 1 is a block diagram showing the functional configuration for IP address configuration of a terminal according to a first embodiment of the present invention.
Figure 17:
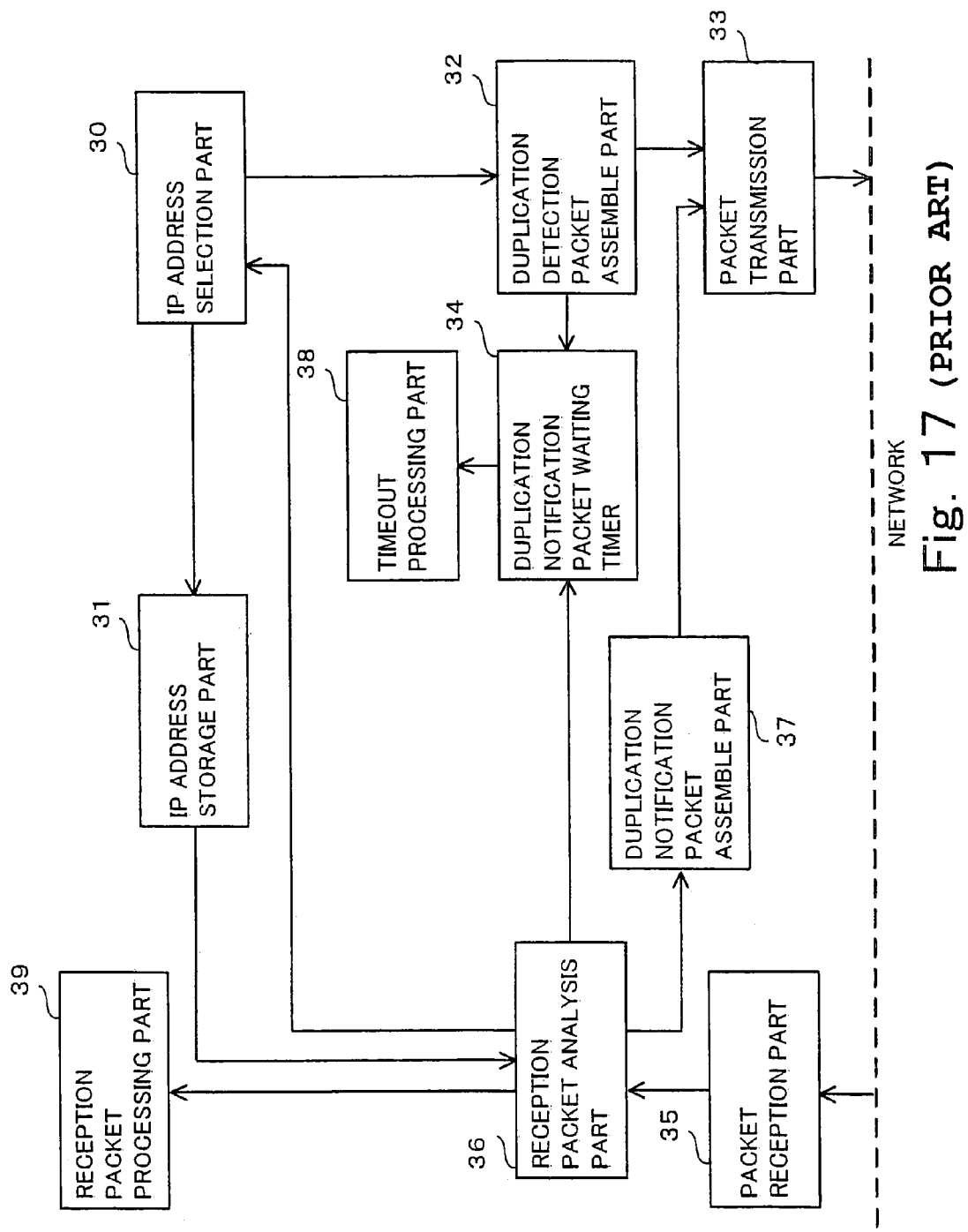
FIG. 17 is a functional block diagram showing the functional configuration for IP address configuration for a terminal of a conventional wireless communication system.

FIG. 1 is a functional block diagram showing the functional configuration for IP address configuration of a terminal according to this first embodiment. In addition to the functional configuration for a terminal of a conventional wireless communication system as shown in FIG. 17, a terminal for this first embodiment has address coordination table 80, duplication notification packet wait-for-send timer 81, duplication notification packet wait-for-send timer timeout processing part 82, packet reception part 83, packet reception analysis part 84 and reception packet processing part 85. In FIG. 1 each function other than the functions of packet reception part 83, reception packet analysis part 84 and reception packet processing part 85 have the same functions as the terminal of a conventional wireless communication system shown in FIG. 17.

Figure 15:
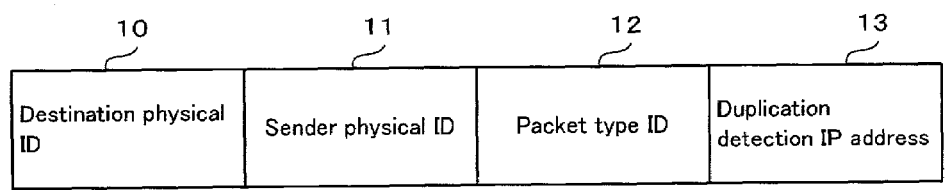
FIG. 15 is an explanatory drawing showing the elements of a duplication detection packet used for a conventional wireless communication system and all embodiments according to the present invention.
Figure 16:
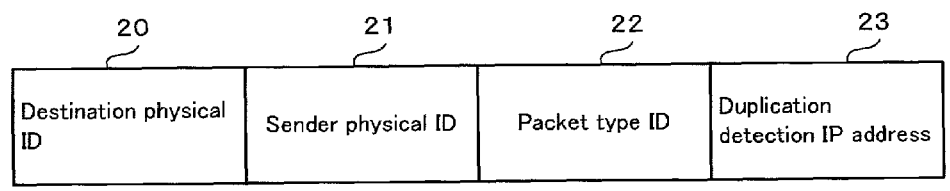
FIG. 16 is an explanatory drawing showing the elements of a duplication notification packet used for a conventional wireless communication system and a first, third and fourth embodiment according to the present invention.

At startup a terminal randomly selects the IP address for temporary use by itself through IP address selection part 30 which stores the selected IP address in IP address storage part 31, before the selected IP address is forwarded to duplication detection packet assemble part 32. At duplication detection packet assemble part 32 a duplication detection packet as shown in FIG. 15 is assembled for detecting whether or not the IP address thus forwarded is duplicated on the network, and the IP address thus forwarded is set in duplication detection IP address 13. Once duplication detection packet assemble part 32 assembles a duplication detection packet it forwards that packet to packet transmission part 33 and simultaneously starts duplication notification packet waiting timer 34. Packet transmission part 33 transmits that packet thus forwarded to the network.

Address coordination table 80 records the correspondence between IP addresses and physical identifiers of other terminals on the network, while the correspondence registered is held inside the table during only a certain period specified by an address coordination maintenance timer. The time for a timeout to be issued by duplication notification packet wait-for-send timer 81 is determined as a value sufficiently larger than the time for transmission of a duplication notification packet by a terminal of a conventional system as shown in FIG. 17 and a value sufficiently smaller than the time for a timeout of duplication notification packet waiting timer 34 are randomly selected by each time at startup.

Further, packet reception part 83 of a terminal according to this first embodiment differs from packet reception part 35 of a terminal for a conventional wireless communication system as shown in FIG. 17 in that besides being capable of receiving a packet with a special identifier representing broadcast or a physical identifier of the terminal itself as the destination physical identifier, packet reception part 83 is also capable of receiving a packet with a physical identifier directed from an external entity set as the destination physical identifier.

Figure 18:
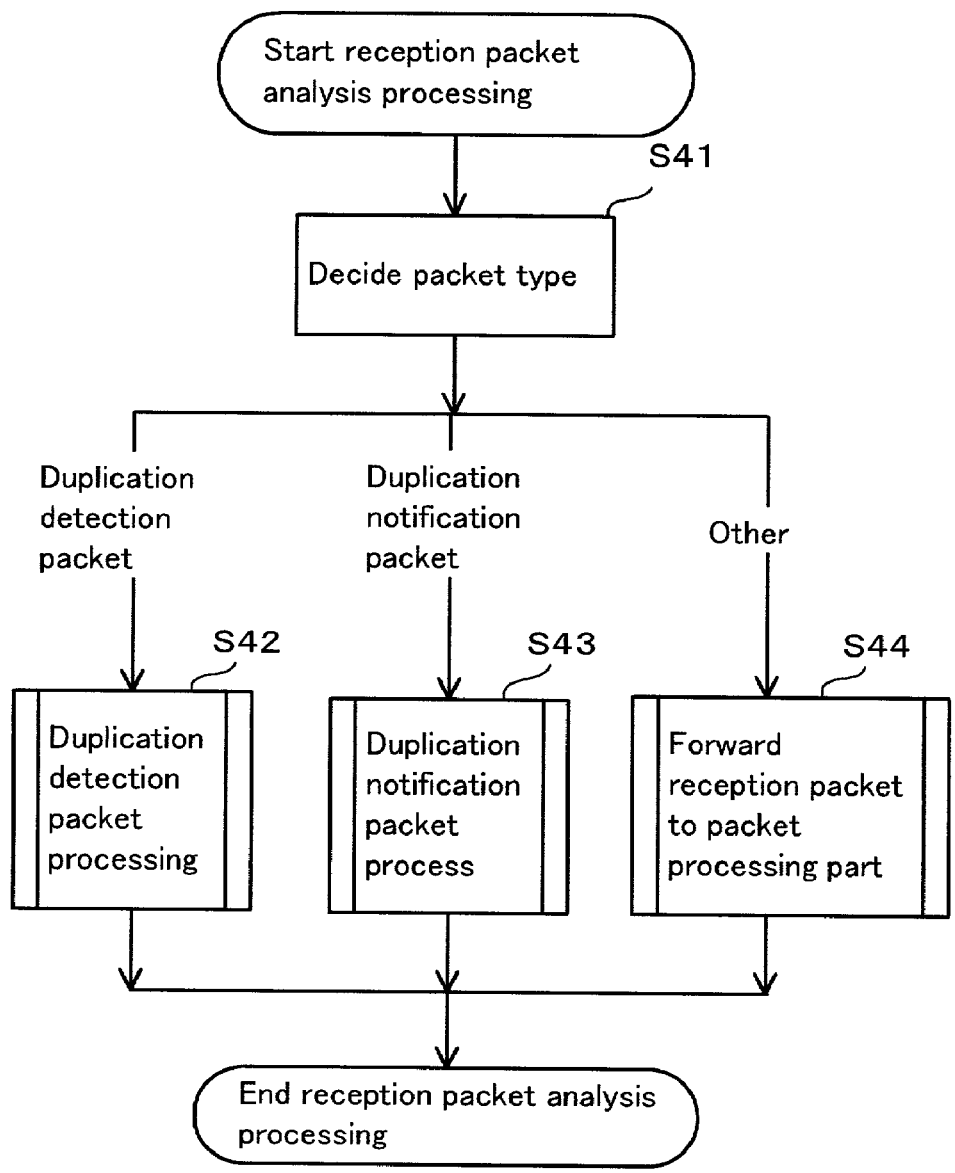
FIG. 18 is a flowchart showing the operational procedures for a reception packet analysis part for a terminal of a conventional wireless communication system and a first and a second embodiment according to the present invention.

Further still, while the operating procedures of reception packet analysis part 84 of a terminal according to this first embodiment are the same as the operating procedures of reception packet analysis part 36 for a conventional wireless communication system as shown in FIG. 18, the details of the procedures for duplication detection packet processing of a conventional step S 42 and duplication notification packet processing of a conventional step S 43 as shown in FIG. 18 are different.

Figure 2:
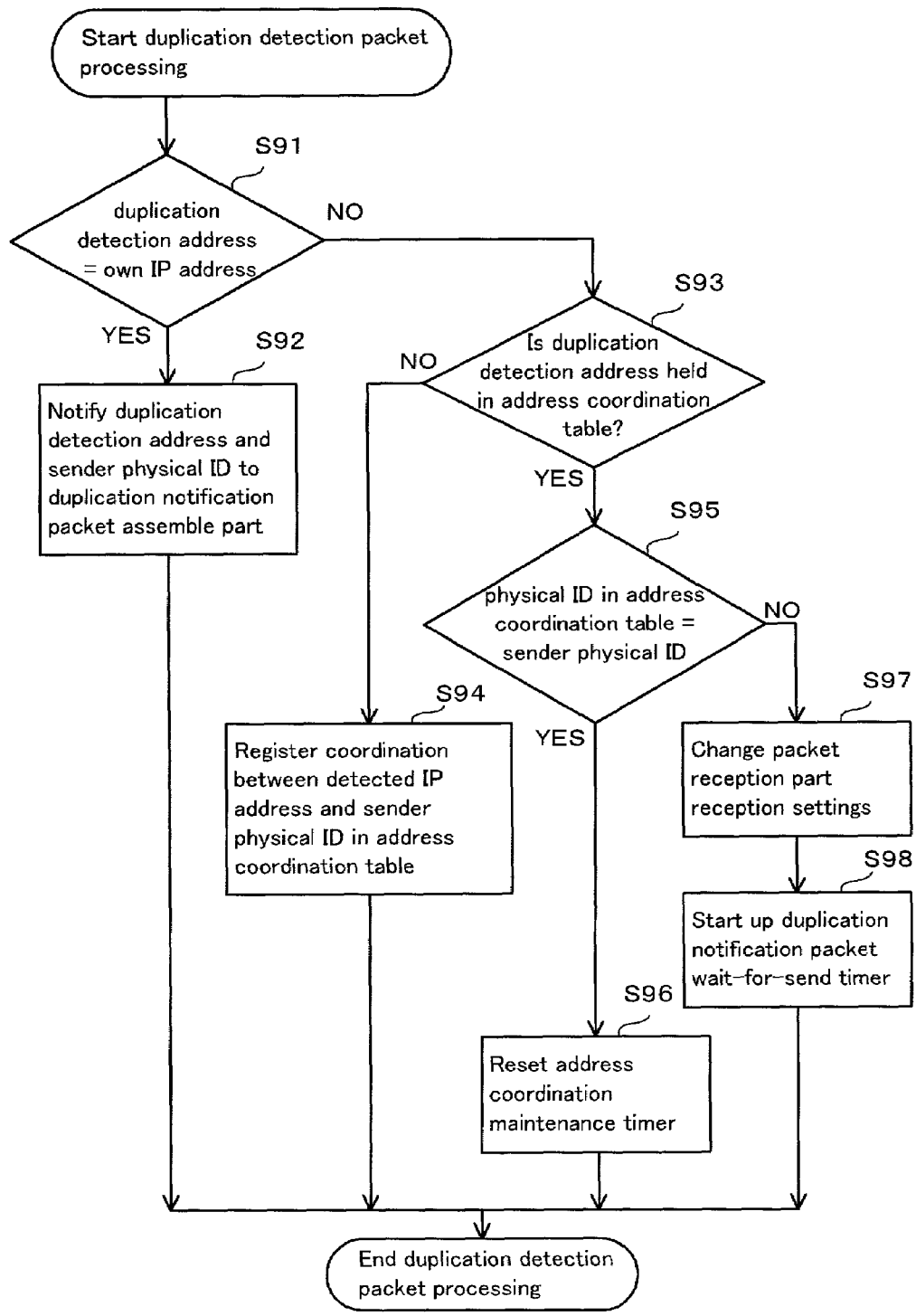
FIG. 2 is a flowchart showing in detail the sequence for duplication detection packet processing of reception packet analysis part 84 of a terminal according to a first embodiment of the present invention.

FIG. 2 is a flowchart showing in detail the sequence for duplication detection packet processing of reception packet analysis part 84 of a terminal according to the first embodiment. As a duplication detection packet is forwarded from packet reception part 83 to reception packet analysis part 84, part 84 decides whether or not IP address 13 which undergoes a duplication inspection is equivalent to the IP address of its own terminal at step S91. If it is equivalent part 84 passes this IP address and the sender physical address identifier 11 of the duplication detection packet received to duplication notification packet assemble part 37 shown in FIG. 1 (step S 92), thereby completing a process. If at step S 91 the IP address that undergoes duplication inspection is not equivalent to the IP address of the terminal of reception packet analysis part 84, part 84 investigates whether or not the IP address subject to the duplication inspection is being held in address coordination table 80 (step S 93). If that inspected IP address is not held in table 80 part 84 decides that there is no IP address duplication and records the coordination between that IP address and the sender physical identifier of the packet subject to duplication inspection (step S 94) thereby completing a process. If at step S 93 the IP address subject to duplication inspection is found in address coordination table 80, at step S 95 part 84 investigates whether the sender physical identifier of the duplication detection packet is equivalent to the physical identifier corresponding to the IP address subject to duplication inspection being held in address coordination table 80. If they are equivalent part 84 decides that there is no IP address duplication, resets the entry for that IP address subject to duplication inspection in the address coordination table in the address coordination maintenance timer (step S 96). Where at step S 95 two physical identifiers are different, part 84 decides that an duplication of IP address may have occurred and changes the reception settings of packet reception part 83 so that it can also receive packets with destination physical identifier equivalent to the sender physical identifier of the duplication detection packet (step S 97) and starts up operations of duplication notification packet wait-for-send timer 81 (step S 98) thereby completing a process. Physical address 11 of the duplication detection packet and IP address 13 subject to inspection are held as supplementary information in duplication notification packet wait-for-send timer 81.

Figure 3:
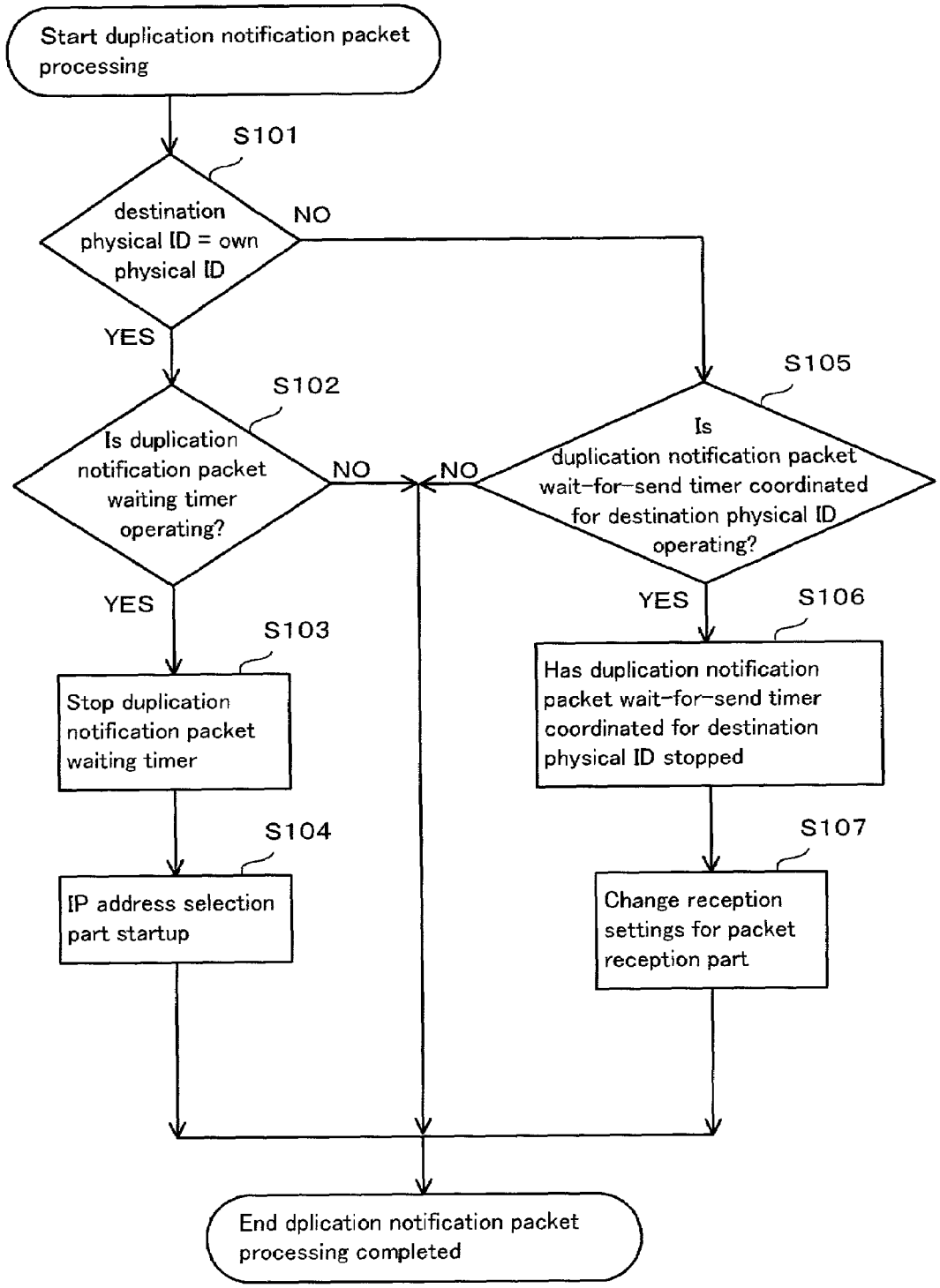
FIG. 3 is a flowchart showing in detail the sequence of duplication notification packet processing of a reception packet analysis part of a terminal according to a first embodiment of the present invention.

FIG. 3 is a flowchart showing in detail the sequence of duplication notification packet processing of a reception packet analysis part 84 of a terminal according to the first embodiment. When a packet forwarded from packet reception part 83 to reception packet analysis part 84 is a duplication notification packet, part 84 investigates whether or not the destination physical identifier 20 of that packet is equivalent to the physical identifier of its own terminal (step S 101) and if it is equivalent part 84 decides on an IP address duplication notification against its own terminal, investigates whether or not duplication notification packet waiting timer 34 at step S 102 is operating or not and if it is operating part 84 decides that the IP address for use by its own terminal is yet to be determined, stops duplication notification packet waiting timer 34 (step S 103), and starts up IP address selection part 30 again (step S 104) thereby completing a process. At step S 101, if the destination physical identifier is different from the physical identifier of the terminal of part 84, part 84 decides that another terminal sent a duplication notification packet and at step S 105, decides whether duplication notification packet wait-for-send timer 81 coordinated for the combination of this destination physical identifier and duplication notification IP address 23 is operating or not. If timer 81 is operating part 84 stops timer 81 (step S 106) and changes the reception settings of packet reception part 83 to stop reception of packets with destination physical identifier equivalent to that of the duplication notification packet.

Figure 4:
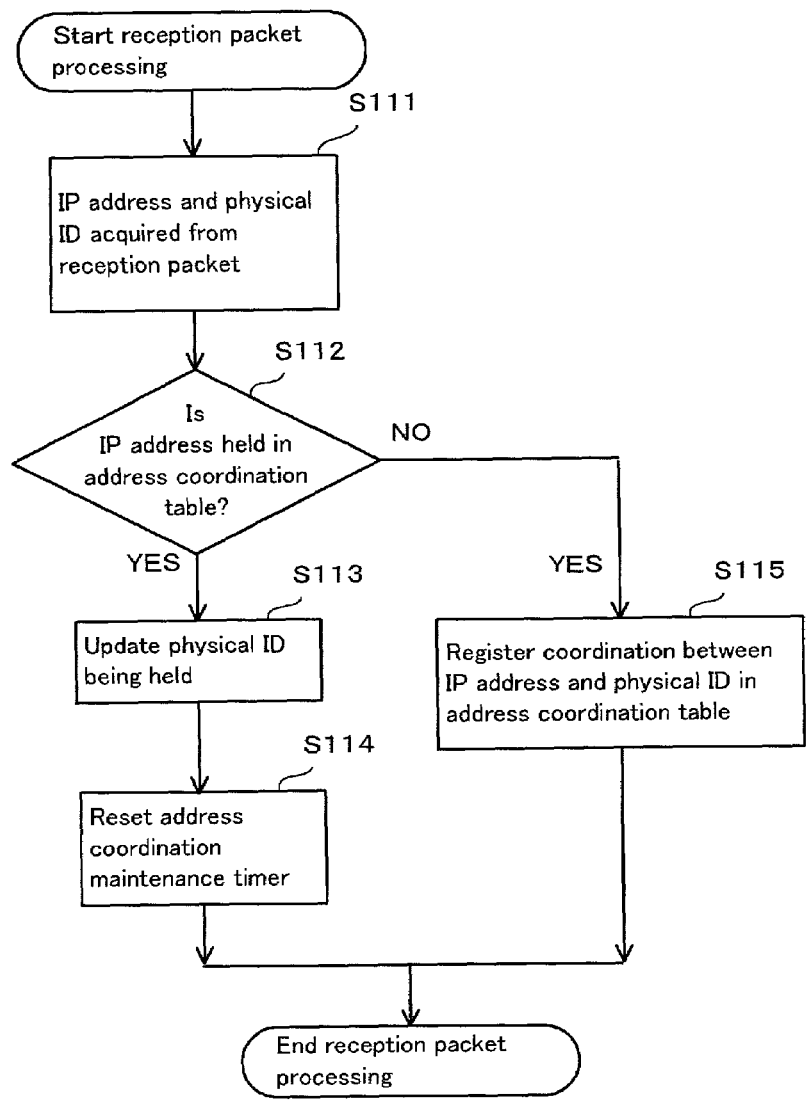
FIG. 4 is a flowchart showing the operational procedures for a reception packet processing part of a terminal according to a first embodiment of the present invention.

FIG. 4 is a flowchart showing the operational procedures for a reception packet processing part 85 of a terminal according to the first embodiment. If a packet is forwarded from reception packet analysis part 84 to reception packet processing part 85, at step S 111 part 85 acquires a sender IP address and sender physical identifier. At step 112, part 85 investigates whether or not this IP address is held in address coordination table 80 and if it is held there, part 85 updates the corresponding physical identifier to the sender physical identifier of the packet it has just received (step S 113) and resets the address coordination maintenance timer to reflect this entry (step S 114). If, at step S 112, the IP address is not held in address coordination table 80, part 85 registers the coordination between that IP address and the physical identifier in address coordination table 80 (step S 115).

Duplication notification packet wait-for-send timer timeout processing part 82 of a terminal for this first embodiment starts up if duplication notification packet wait-for-send timer 81 expires and then part 82 forwards the physical identifier and the IP address corresponding to the timer which expired to duplication notification packet assemble part 37. At duplication notification packet assemble part 37 a duplication notification packet is assembled and the duplication notification packet is sent from packet transmission part 33. Further, part 82 updates the reception settings of packet reception part 83 to stop reception of packets whose destination physical identifier is the physical identifier corresponding to the timer that expired.

As described, this first embodiment realizes provision of a wireless communication system in which if a terminal detects the existence of multiple other terminals with the same IP address amongst all the other terminals to which that terminal is able to communicate that have an IP address different to the IP address of that terminal itself, that terminal issues notification of that IP address duplication to all, some or one of those multiple other terminals having that same IP address.

Further, this first embodiment realizes provision of a wireless communication system wherein if the IP address selected by a newly started up terminal is equivalent to an IP address already being used by another terminal on the network, moreover these terminals are in relation of hidden terminal and are therefore unable to detect the IP address duplication, a terminal capable of communicating to both those terminals detects the duplication and is able to notify the duplication to the terminal about to acquire a new IP address.

A second embodiment of the present invention will now be described.

This second embodiment differs from the first embodiment in that duplication notification packets are broadcast over the network.

Figure 5:
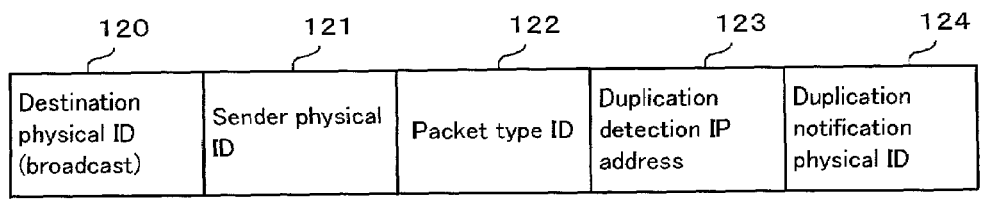
FIG. 5 is an explanatory drawing showing the elements of a duplication notification packet used for a second embodiment according to the present invention.

The elements of a duplication notification packet used for the second embodiment are shown in FIG. 5. A special identifier indicating broadcast is set for destination physical identifier 120 of a duplication notification packet, an IP address detected as being duplicated is set as duplication notification IP address 123 and the physical identifier of a terminal to receive the duplication notification is set for duplication notification physical identifier 124.

Figure 6:
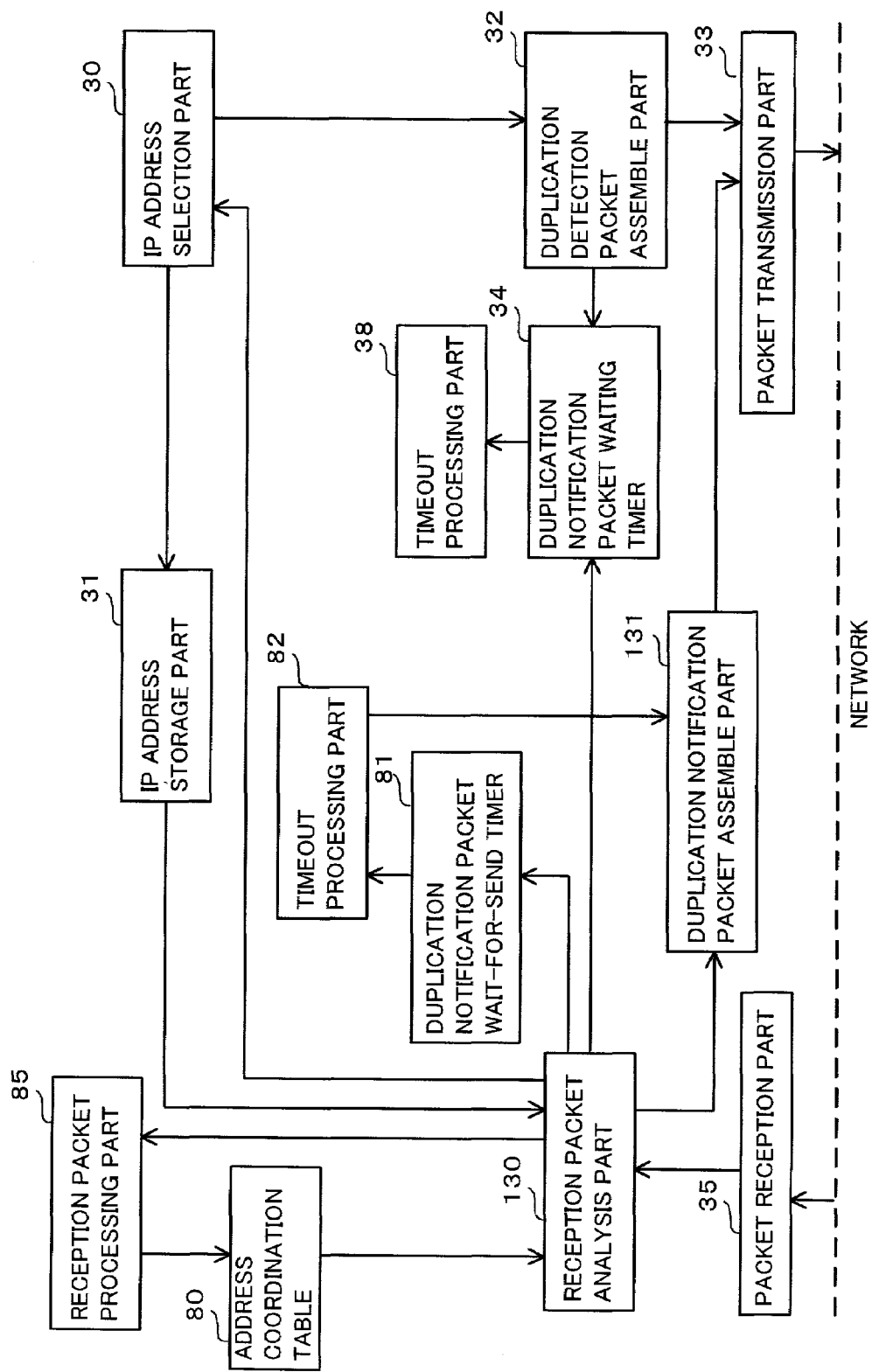
FIG. 6 is a functional block diagram showing the functional configuration for IP address configuration of a terminal according to a second embodiment of the present invention.

The functional configuration concerning the configuration of an IP address of a terminal according to this second embodiment are shown in FIG. 6. A terminal of the second embodiment differs from a terminal of the first embodiment by using a conventional type reception part 35 as shown in FIG. 17 for a packet reception part which receives only packets having special identifier indicating broadcast or a physical identifier of that terminal itself as destination physical identifier, by differing the detailed procedures of duplication detection packet processing and duplication notification packet processing of reception packet analysis part 130 and by assembling a duplication notification packet as shown in FIG. 5 in duplication notification packet assemble part 131.

A duplication notification packet as shown in FIG. 5 is assembled in duplication notification packet assemble part 131 of a terminal of this second embodiment and a physical identifier and IP address forwarded from reception packet analysis part 130 or duplication notification packet wait-for-send timer timeout processing part 82 are set for duplication notification physical identifier 124 and for duplication notification IP address of a duplication notification packet respectively, then duplication notification packet is forwarded by part 131 to packet transmission part 33.

Figure 7:
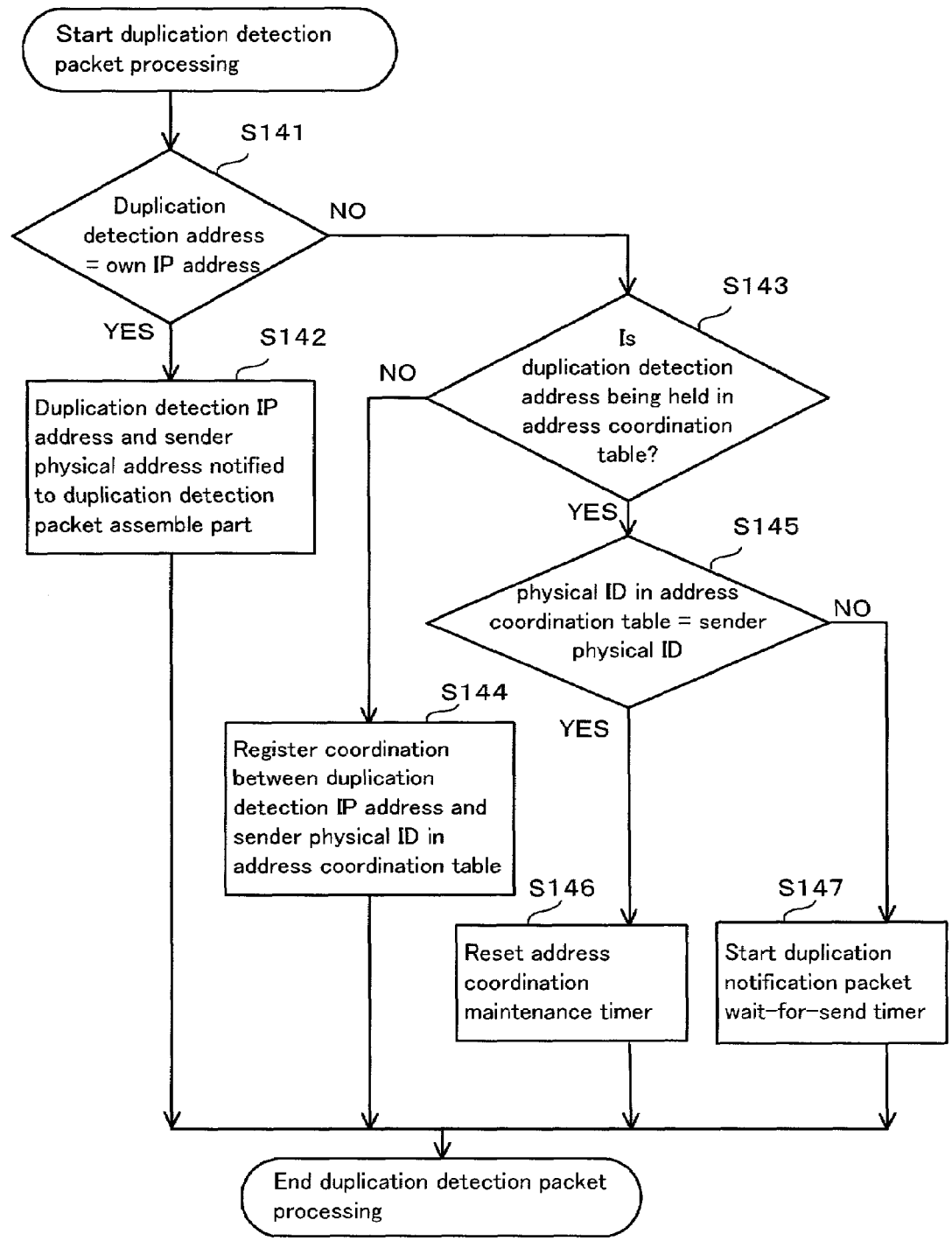
FIG. 7 is a flowchart showing in detail the sequence for duplication detection packet processing of a packet analysis part for a second embodiment according to the present invention.

FIG. 7 is a flowchart showing in detail the sequence for duplication detection packet processing of packet analysis part 130 for this second embodiment. Apart from the fact that no changes are required to the reception settings of the packet reception part 35 in the processing procedures of a duplication detection packet of the second embodiment shown in FIG. 7, there is no difference from the processing procedures of the duplication detection packet of the first embodiment shown in FIG. 2.

Figure 8:
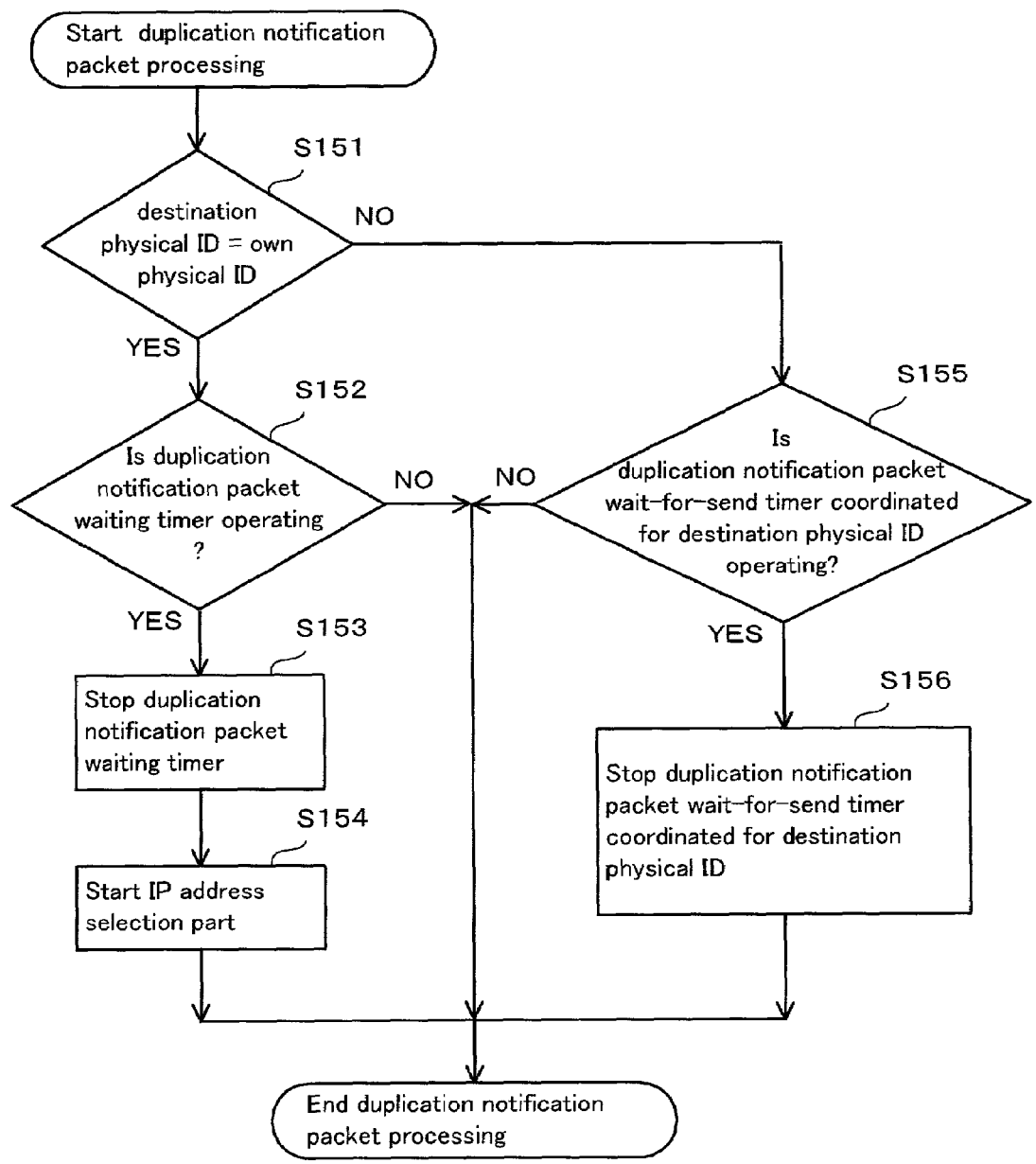
FIG. 8 is a flowchart showing in detail the sequence for duplication notification packet processing of a reception packet analysis part of a terminal according to a second embodiment of the present invention.

FIG. 8 is a flowchart showing in detail the sequence for duplication notification packet processing of packet analysis part 130 of a terminal according to the second embodiment. Apart from the fact that in processing procedures of a duplication notification packet of the second embodiment shown in FIG. 8 no changes are required to the reception settings of packet reception part 35 and that it is not the destination physical identifier of a duplication notification packet received that is handled but a duplication notification physical identifier instead, there is no difference from the processing procedures of a duplication notification packet of the first embodiment shown in FIG. 3.

As described, this second embodiment realizes provision of a wireless communication system wherein changes to the reception settings of packet reception part 35 are not required and wherein if a terminal detects the existence of multiple other terminals with the same IP address amongst all the other terminals to which that terminal is able to communicate that have an IP address different to the IP address of that terminal itself, that terminal issues notification of that IP address duplication to all or some of those multiple other terminals having that same IP address.

Further, this second embodiment realizes provision of a wireless communication system wherein if the IP address selected by a newly started up terminal is equivalent to an IP address already being used by another terminal on the network, moreover these terminals are in a hidden terminal relationship and are therefore unable to detect the IP address duplication, a terminal capable of communicating to both those terminals detects the duplication and is able to notify the terminal about to acquire a new IP address about the duplication.

A third embodiment of the present invention will now be described.

A terminal of the third embodiment differs from a terminal for a conventional wireless communication system in that for this third embodiment when a terminal of this third embodiment decides the IP address it will use itself and thereafter address advertizing packets are broadcast at periodic intervals for the purpose of issuing notice to the network of IP addresses being used and in that an IP address duplication can be detected through such an address advertizing packets.

Figure 9:
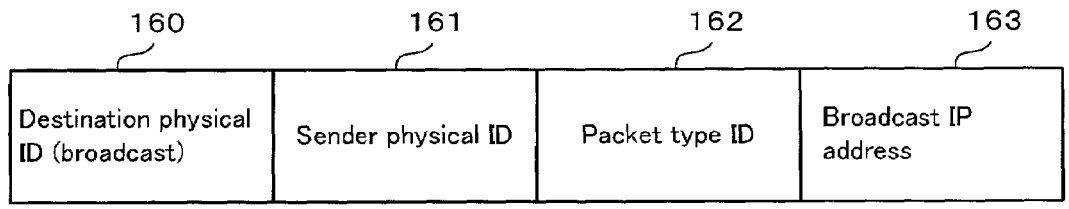
FIG. 9 is a drawing showing the elements of an address broadcast packet used for a third and a fourth embodiment according to the present invention.

FIG. 9 shows the elements of an address advertizing packet. The terminal that sends an address advertizing packet sets a special identifier representing broadcast for destination physical identifier 160, sets a physical identifier for itself in sender physical identifier 161, sets a value representing an address advertizing packet for packet type identifier 162 and sets the IP address of itself for advertizing IP address 163.

Figure 10:
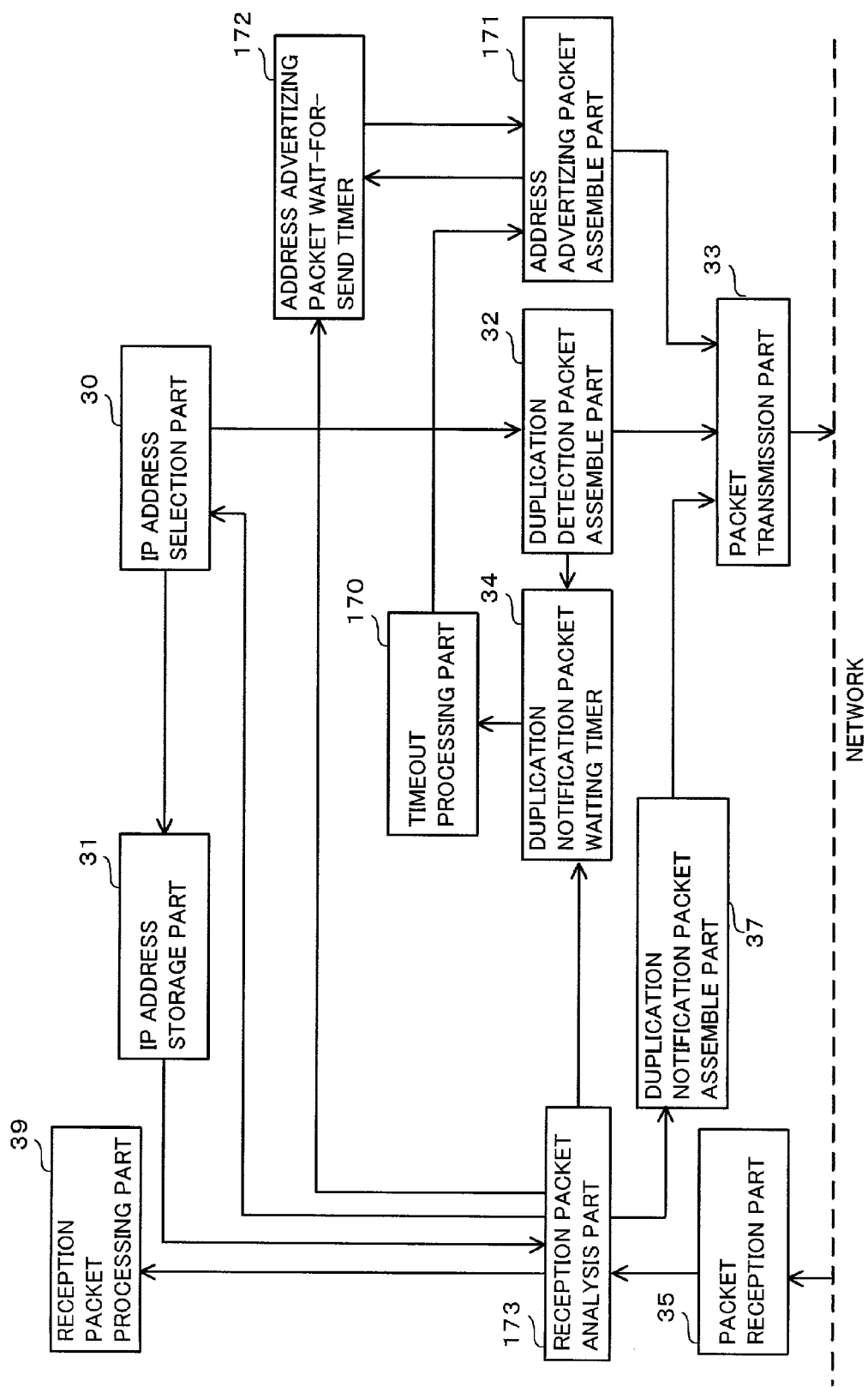
FIG. 10 is a functional block diagram showing the functional configuration for IP address configuration of a terminal according to a third embodiment of the present invention.

FIG. 10 is a functional block diagram showing the functional configuration for IP address configuration of a terminal according to the third embodiment. In comparison to a terminal of a conventional wireless communication system as shown in FIG. 17, a terminal of this third embodiment differs in that the procedures for duplication notification packet wait-time-timeout processing part 170 and for reception packet analysis part 173 are different and in that there are the additional elements of address advertizing packet assemble part 171 and address advertizing packet wait-for-send timer 172.

A duplication notification packet wait-time-timeout processing part 170 of a terminal of this third embodiment starts operating when duplication notification packet waiting timer 34 times out, starts up address advertising packet assemble part 171 and commences communicating using an IP address held in IP address storage part 31.

Address advertizing packet assemble part 171 assembles an address advertizing packet as shown in FIG. 9, forwards this packet to packet sending part 33 and starts up address advertizing packet wait-for-send timer 172 which waits for a specified timeout period. If timer 172 does timeout, address advertizing packet assemble part 171 starts up.

Figure 11:
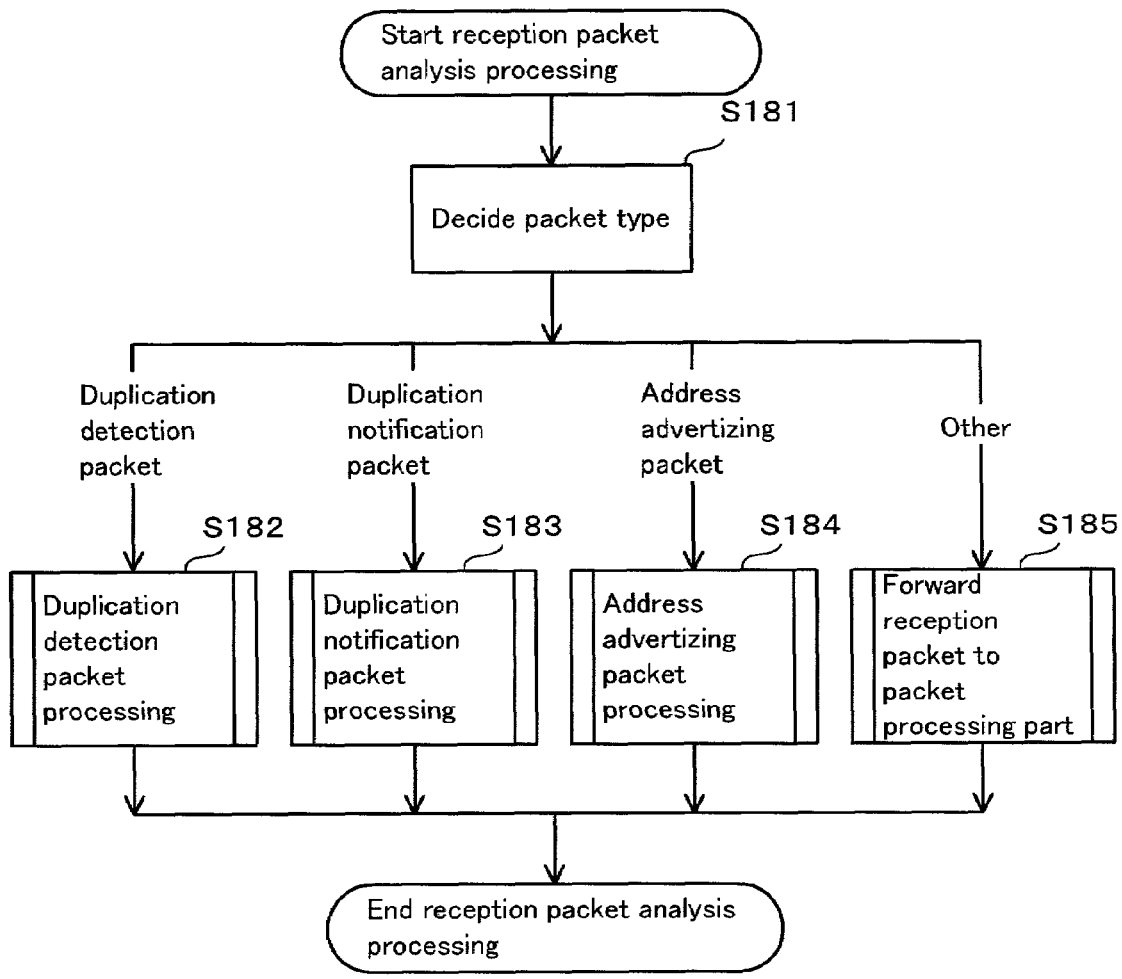
FIG. 11 is a flowchart showing the operational procedures for a reception packet processing part of a terminal according to a third and a fourth embodiment of the present invention.
Figure 19:
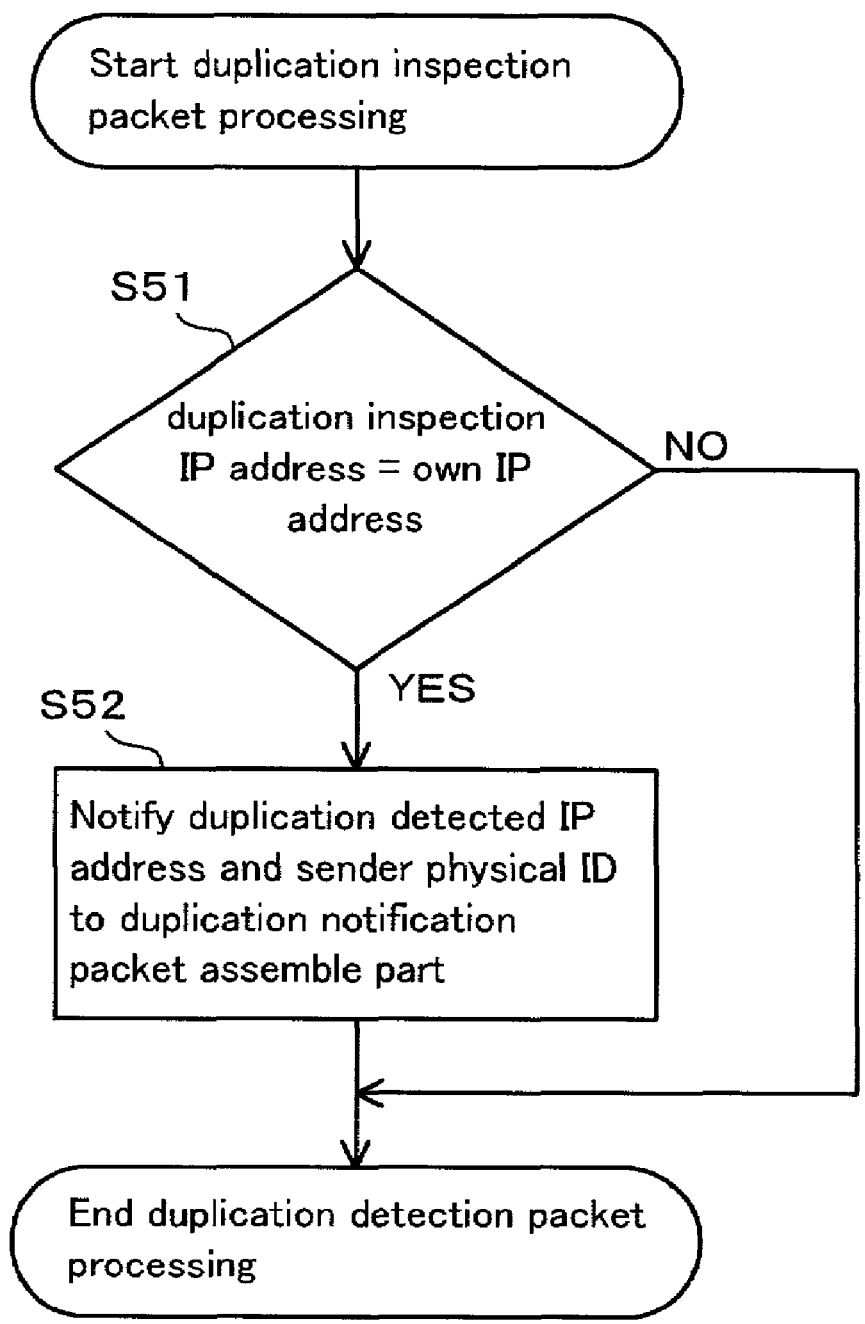
FIG. 19 is a flowchart showing in detail the sequence for duplication detection packet processing of a packet analysis part for a second embodiment according to the present invention.
Figure 20:
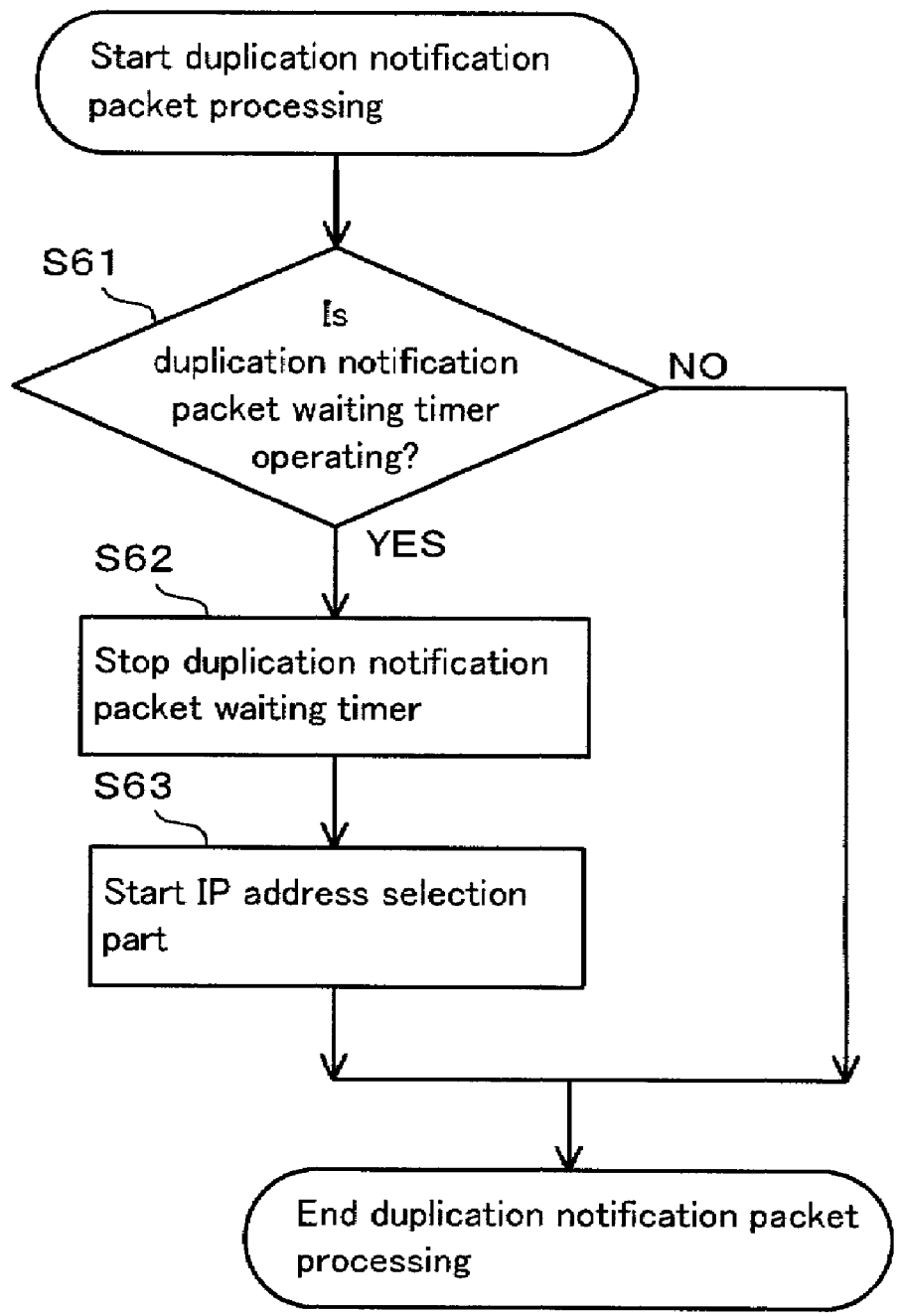
FIG. 20 is a flowchart showing in detail the sequence for duplication notification packet processing of a reception packet analysis part for a terminal of a conventional wireless communication system.
Figure 21:
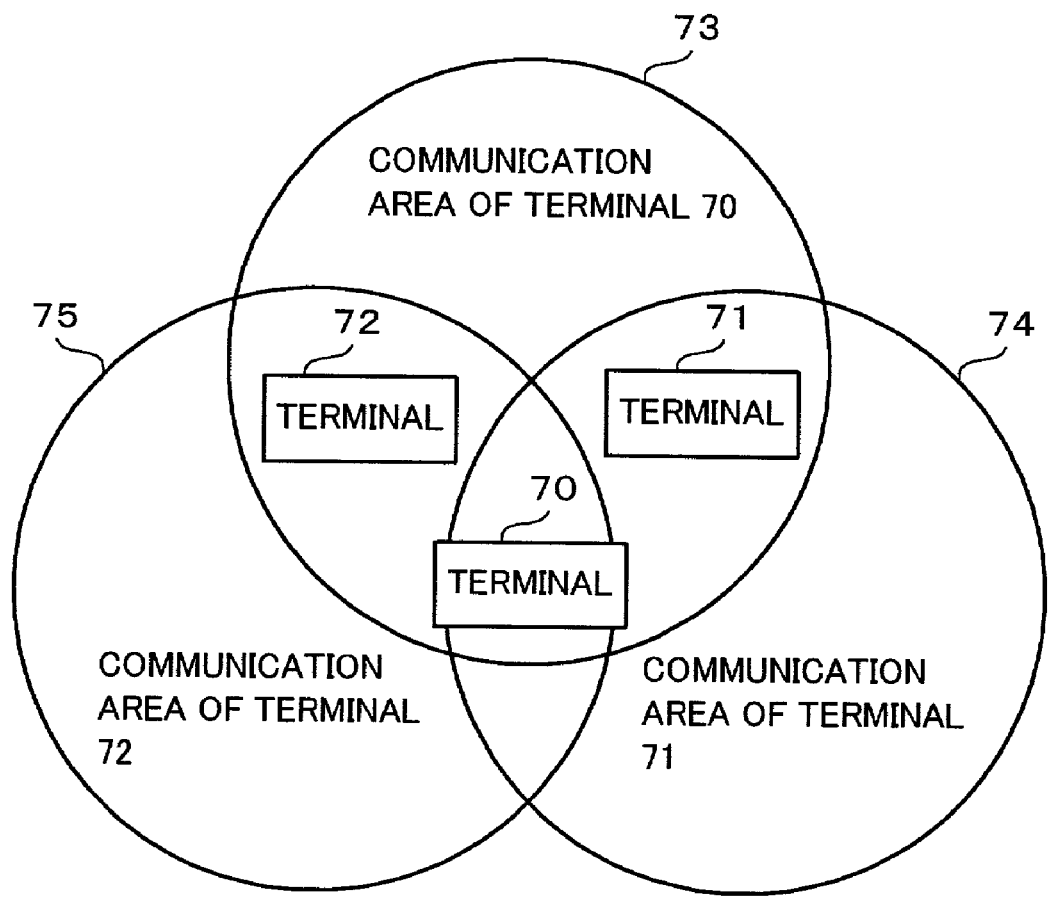
FIG. 21 is an explanatory drawing of hidden terminals in wireless communications.

FIG. 11 shows the operations of reception packet processing part 173 of a terminal according to this third embodiment. In comparison to the operating procedures of a reception packet analysis part of a terminal of the first or second embodiment of the present invention or of a conventional wireless communication system as shown in FIG. 18, this processing part 173 differs only in the addition of address advertising packet processing at step S 184. Details of procedures for duplication detection packet processing of step S182 and duplication notification packet processing of step S183 as performed by reception packet processing part 173 are respectively the same as the duplication detection packet processing procedures shown in FIG. 19 and the duplication notification packet processing procedures shown in FIG. 20, performed by reception packet processing part 36 of a terminal of a conventional wireless communication system.

Figure 12:
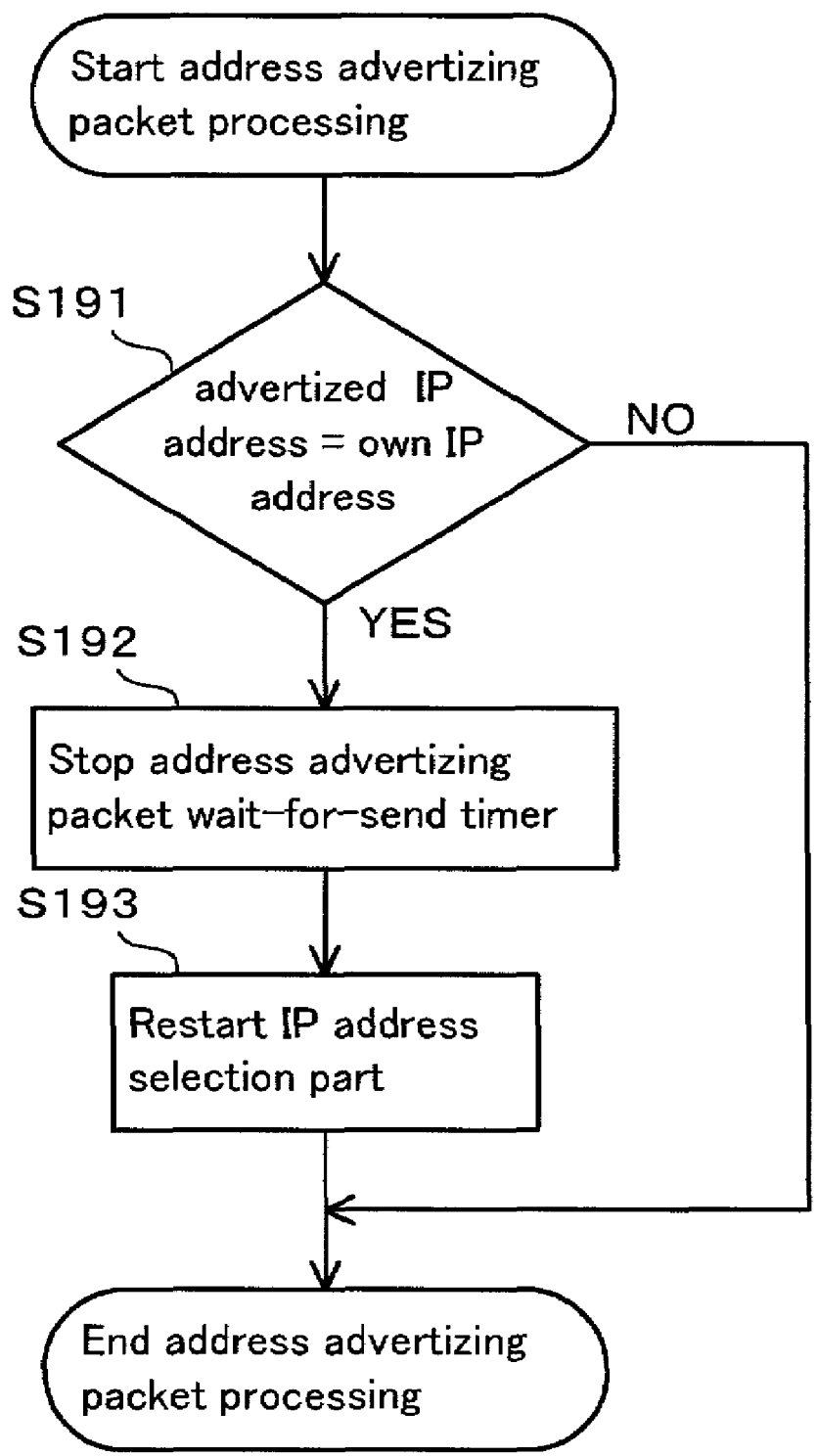
FIG. 12 is a flowchart showing in detail the procedures for address broadcast packet processing of a reception packet analysis part of a terminal according to a third embodiment of the present invention.

FIG. 12 shows procedures in detail for address advertising packet processing 184 by reception packet processing part 173. If an address advertising packet is forwarded from packet processing part 35 to reception packet processing part 173, part 173 decides whether or not the IP address advertized by the address advertising packet is equivalent to the IP address used for its own terminal at step S191. If not equivalent part 173 completes that process, however if the IP address thus advertised is equivalent to that of its own terminal, part 173 stops address advertising packet wait-for-send timer 172 (step S 192) and restarts IP address selection part 30 (step S 193) thereby completing a process.

This third embodiment has been described with respect to its application in a wireless communication system however it could equally be applied to a wired communication system.

As described, this third embodiment realizes provision of a wireless communication system wherein advertising packets are broadcast periodically after a terminal of this third embodiment decides the IP address it will use for the purpose of issuing notice to the network of IP addresses being used and wherein IP address duplication can be detected through such an address advertising packet.

A fourth embodiment according to the present invention will now be described.

A terminal of the fourth embodiment differs from a terminal of the first embodiment in that for this fourth embodiment address advertizing packets are broadcast periodically after a terminal of this fourth embodiment decides the IP address it will use itself for the purpose of issuing notice to the network of IP addresses being used and in that an IP address duplication can be detected through such an address advertising packet.

Figure 13:
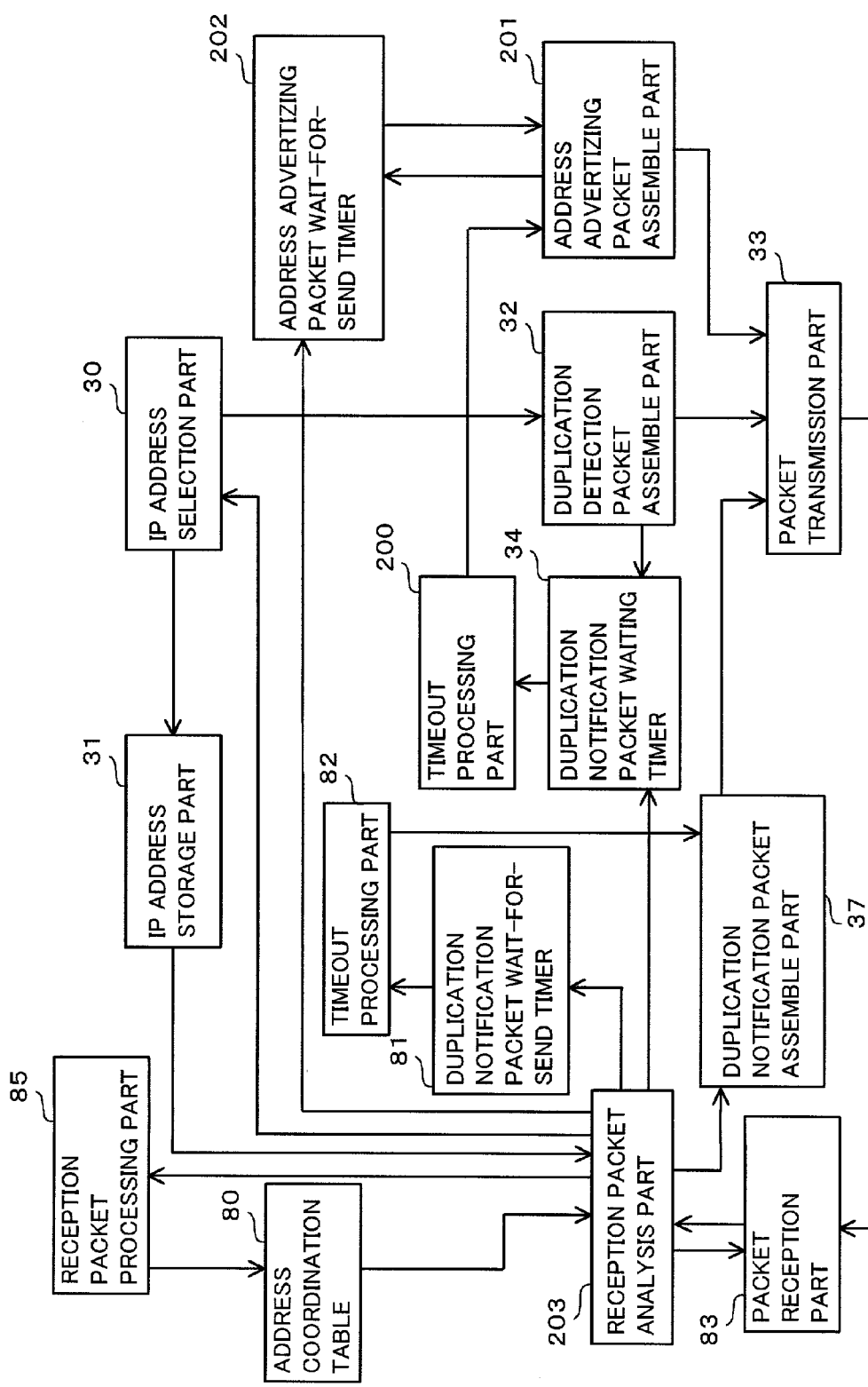
FIG. 13 is a functional block diagram showing the functional configuration for IP address configuration of a terminal according to a fourth embodiment of the present invention.

FIG. 13 shows a functional configuration for IP address configuration of a terminal according to the fourth embodiment. In comparison to a terminal of the first embodiment as show and in FIG. 1, a terminal of this fourth embodiment differs in that the procedures for duplication notification packet wait-time-timeout processing part 200 and for reception packet analysis part 203 are different and in that there are the additional elements of address advertising packet assemble part 201 and address advertising packet wait-for-send timer 202.

The respective procedures performed by duplication notification packet wait-time-timeout processing part 200, address broadcast packet assemble part 201 and address broadcast packet wait-for-send timer 202 are the same as the procedures for each of the corresponding functions performed by a terminal according to the third embodiment.

The operating procedures of reception packet analysis part 203 according to the fourth embodiment are the same as the procedures performed by reception packet analysis part 173 of the third embodiment as shown in FIG. 11. The detailed procedures for duplication inspection packet processing and duplication notification packet processing by part 203 are the same as those for duplication inspection packet processing shown in FIG. 2 and duplication notification packet processing shown in FIG. 3 of reception packet analysis part 84 by a terminal according to the first embodiment.

Figure 14:
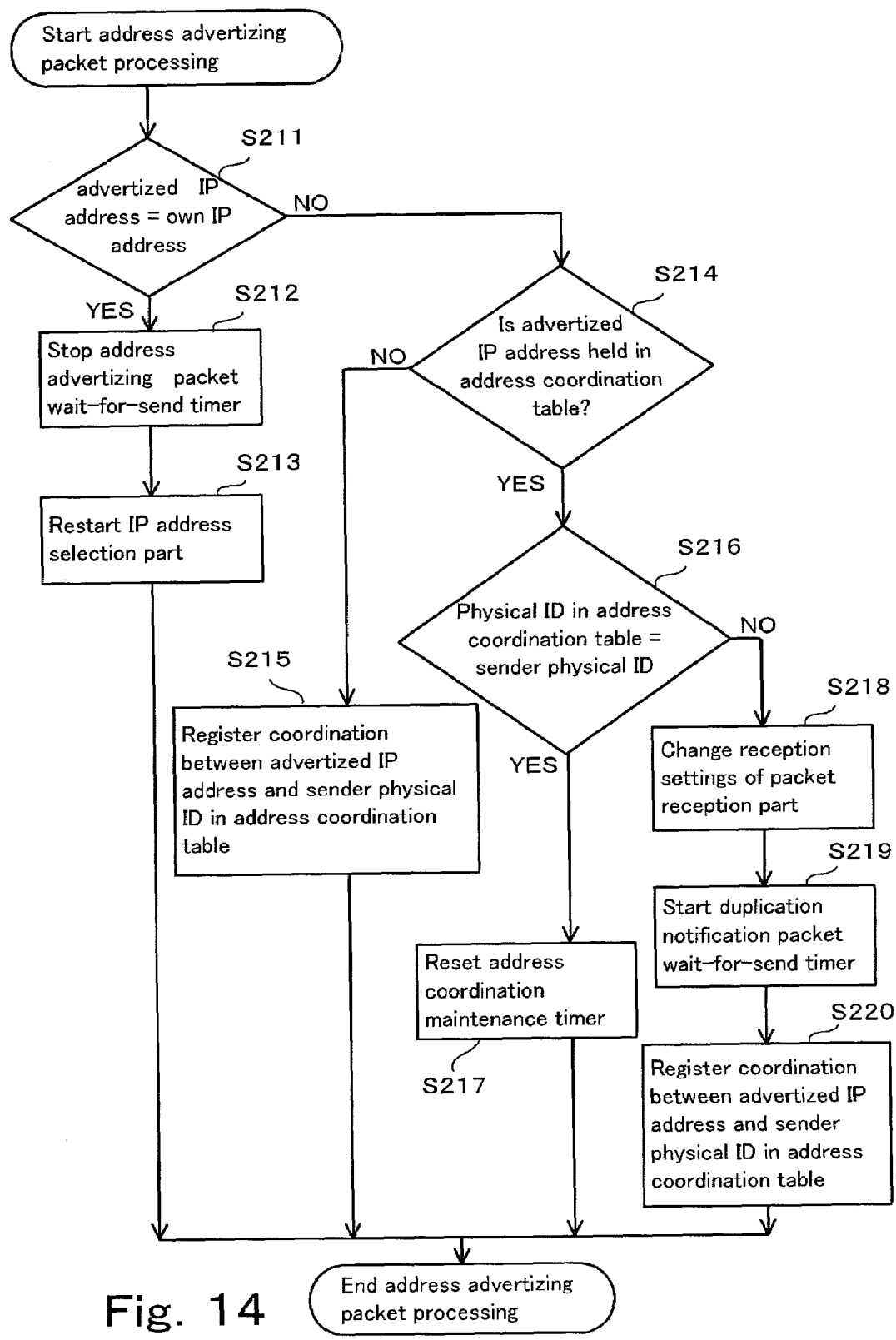
FIG. 14 is a flowchart showing in detail the procedures for address broadcast packet processing of a reception packet analysis part of a terminal according to a fourth embodiment of the present invention.

FIG. 14 shows in detail the procedures for address advertising packet processing by a terminal according to the fourth embodiment. As an address advertising packet is forwarded from packet reception part 83 to reception packet analysis part 203, part 203 decides whether or not the IP address advertized through an address advertising packet is equivalent to the IP address of its own terminal at step S 211. If it is equivalent part 203 stops address advertising packet wait-for-send timer 202 (step S 212), and restarts IP address selection part 30 (step S 213) thereby completing a process, however if not equivalent part 203 investigates whether or not the IP address advertised is held in address coordination table 80 at step S 214, and if that IP address is not held in table 80 part 203 registers the coordination between that IP address and the physical identifier of the address advertising packet in address coordination table 80 (step S 215) thereby completing a process. If, at step S 214 advertised IP address is held in table 80, at step S 216 part 203 investigates whether the sender physical identifier of the address advertising packet is equivalent to the physical identifier corresponding to the advertized IP address held in address coordination table 80 and if they are equivalent part 203 resets the address coordination maintenance timer to reflect this entry (step S 217) thereby completing a process. If at step 216, the sender physical identifier of the address advertizing packet is different from that physical identifier held in address coordination table 80 part 203 decides that an IP address duplication has occurred, changes the reception settings of packet reception part 83 so that it can also receive packets whose destination physical identifier is equivalent to the sender physical identifier of the address advertising packet (step S 218) and starts up operations of duplication notification packet wait-for-send timer 81 (step S 219), further part 203 updates the physical identifier for the advertized IP address in address coordination table 80 to the sender physical identifier of the address advertising packet (step S 220) thereby completing a process. The IP address detected as being duplicated and the sender physical identifier are held in duplication notification packet wait-for-send timer 81 as supplementary information.

As described, this fourth embodiment realizes provision of a wireless communication system wherein advertising packets are periodically broadcast after a terminal of this fourth embodiment decides the IP address it will use itself for the purpose of issuing notice to the network of IP addresses being used and wherein IP address duplication can be detected through such an address advertizing packet.

Further, this fourth embodiment realizes provision of a wireless communication system wherein if terminals with a duplicated address are in relation of hidden terminal that IP address duplication can be detected through an address advertizing packet broadcast by a terminal capable of communicating with those terminals with that duplicate address.

Again, an embodiment with an additional part capable of detecting an IP address duplication through broadcast of an address advertizing packet is also conceivable.

Through the present invention even when there is duplication of terminal identifiers between terminals that are in relation of hidden terminal, because notification can be issued by a terminal capable of communicating to those terminals with that duplicate address, detection of that duplication of terminal identifiers of those terminals and processes to resolve that duplication can be performed easily.

Further, through the present invention, because a terminal periodically broadcasts its own terminal identifier over the network, when multiple terminals with the same terminal identifier which terminals are located outside the region in which they are able to communicate with each other become able, through something like being moved for example, to communicate with each other, that duplication of terminal identifiers can be quickly detected and detection of that duplication of terminal identifiers of those terminals and processes to resolve that duplication can be performed easily.

Again, through the present invention, even after the terminal identifier to be used by a terminal has been decided, if duplication of that terminal identifier is detected, through such actions as acquiring a unique terminal identifier within a network and resuming communication, processes to resolve that duplication of those terminal identifiers can be performed easily.

What is claimed is:

1. A wireless communication system comprising multiple terminals each of which terminals has a unique terminal identifier to be identified from any other terminal on the network, wherein each respective of said multiple terminals comprises:
   a terminal identification means for identifying any other terminal with which the respective one of the terminals communicates using the terminal identifier of the other terminal;
   a duplication notification means that operates when the respective terminal detects the existence of another terminal having the same terminal identifier as the respective terminal to issue notification of that duplication of terminal identifiers to the another terminal;
   a substitute notification means which operates when the respective terminal detects that plural other terminals to which the respective terminal can communicate have the same terminal identifier, but different from the terminal identifier of the respective terminal, to notify the duplication of the same terminal identifier to at least one of said plural other terminals wherein the network on which said multiple terminals are connected is an IP (Internet Protocol) network utilizing IP addresses for terminal identifiers and,
   wherein said terminal identification means provides an address coordination table that, for a specified time, holds the coordination between the IP address of each other terminal on said IP network and a physical identifier unique to each said other terminal and provides a registration means that operates when a sender and IP address of a duplication notification packet received by the respective terminal from any other terminal is different from the IP address of the respective terminal, moreover said sender IP address is not registered in said address coordination table, to register said sender IP address and the physical identifier of the terminal that is said sender in said address coordination table.

2. The wireless communication system according to claim 1 wherein each of said multiple terminals further comprises:
   a selection means for selecting at random a terminal identifier when commencing participation on the network;
   an inquiry means for inquiring whether or not said selected terminal identifier is duplicated with a terminal identifier being used by any other terminal that has already commenced communicating on the network;
   a means for repeating a terminal identifier selection through said selection means and/or an inquiry through said inquiry means until discontinuation of a duplication notification from the duplication notification means.

3. The wireless communication system according to claim 2 wherein:
   said inquiry means includes a means for broadcasting notification in the form of a duplication inspection packet recording the IP address of the respective terminal and a unique physical identifier for the respective terminal to another terminal or terminals on the network;
   said duplication notification means includes a means for immediately sending a duplication notification packet when the sender IP address of a duplication notification packet received from another terminal by the respective terminal is the same as the IP address being used by the respective terminal;
   said substitute notification means includes a means for sending a duplication notification packet when the sender IP address of a duplication notification packet received from another terminal is different from the corresponding physical identifier registered in said address coordination table, moreover for a specified period of time, other terminals have not sent a duplication notification packet.

4. The wireless communication system according to claim 3 wherein a duplication notification packet is sent to the physical identifier of the sender of a duplication inspection packet.

5. The wireless communication system according to claim 3 wherein:
   a duplication notification packet is notified by broadcast the terminal that sent a duplication inspection packet knows of an IP address duplication through the physical identifier set in a duplication notification packet.

6. The wireless communication system according to claim 2 wherein each of said multiple terminals further comprises:
   an advertizing means for periodically advertizing the terminal identifier being used by the respective terminal to the other terminals on the network after the respective terminal commences participating on the network; and
   a means for changing a physical identifier for the respective terminal when the same terminal identifier that the respective terminal is using or is going to use is advertized from another terminal.

7. The wireless communication system according to claim 6 wherein each of said multiple terminals further comprises a notification means that operates when a terminal identifier advertized from one terminal is the same as the terminal identifier of a second terminal, which second terminal can communicate with a third individual terminal but which second terminal is hidden from and unable to communicate directly with said one terminal advertizing the terminal identifier, so that said notifidation means notifies the terminal identifier duplication to said hidden second terminal.

8. The wireless communication system according to claim 7 wherein:

said advertizing means includes a means for advertizing notification in the form of an advertizing packet recording the IP address of the respective terminal and a unique physical identifier for the respective terminal to another terminal or terminals on the network;

said substitute notification means operates such that when the sender IP address of an advertizing packet received from another terminal is different from the corresponding physical identifier registered in said address coordination table, in addition to sending a duplication notification packet to the terminal for that registered physical identifier, provides a means for updating the appropriate corresponding physical identifier in said address coordination table to the physical identifier notified through the advertizing packet.

9. A wireless communication system comprising multiple terminals performing wireless communication each of which terminals is allocated at random a terminal identifier to identify a respective terminal from any other terminal on the network, wherein each respective of said multiple terminals comprises:

a terminal identification means for identifying any other terminal with which the respective terminal communicates using the terminal identifier of another terminal when the respective terminal performs communication with that other terminal;

an advertizing means for periodically advertizing the terminal identifier being used by the respective terminal to the other terminals on the network after each of said multiple terminals commences participating on the network; and a means for changing a physical identifier for the respective terminal when the same terminal identifier that the respective terminal is using or is going to use is advertized from another terminal wherein the network on which said multiple terminals are connected is an IP (Internet Protocol) network utilizing IP addresses for terminal identifiers and wherein, said terminal identification means provides an address coordination table that, for a specified time, holds the coordination between the IP address of each other terminal on said IP network and a physical identifier unique to each said other terminal and provides a registration means that operates when a sender and IP address of a duplication notification packet received by the respective terminal from any other terminal is different from the IP address of the respective terminal, moreover said sender IP address is not registered in said address coordination table, to register said sender IP address and the physical identifier of the terminal that is said sender in said address coordination table.

* * * * *